US011046362B1

(12) United States Patent
Snider, Jr.

(10) Patent No.: US 11,046,362 B1
(45) Date of Patent: Jun. 29, 2021

(54) MOWER CASTOR SWIVEL AND STEERING CONTROL SYSTEMS

(71) Applicant: H. Dean Snider, Jr., Keithville, LA (US)

(72) Inventor: H. Dean Snider, Jr., Keithville, LA (US)

( * ) Notice: Subject to any disclaimer, the term of this patent is extended or adjusted under 35 U.S.C. 154(b) by 0 days.

(21) Appl. No.: 17/152,225

(22) Filed: Jan. 19, 2021

Related U.S. Application Data

(60) Provisional application No. 63/060,429, filed on Aug. 3, 2020.

(51) Int. Cl.
| | |
|---|---|
| *B62D 9/00* | (2006.01) |
| *A01D 34/64* | (2006.01) |
| *A01D 34/82* | (2006.01) |
| *A01D 34/86* | (2006.01) |
| *A01D 101/00* | (2006.01) |

(52) U.S. Cl.
CPC .............. *B62D 9/00* (2013.01); *A01D 34/64* (2013.01); *A01D 34/822* (2013.01); *A01D 34/824* (2013.01); *A01D 34/86* (2013.01); *A01D 2101/00* (2013.01)

(58) Field of Classification Search
CPC .......... B62D 9/00; A01D 34/64; A01D 34/86; A01D 34/824; A01D 34/822; A01D 2101/00
See application file for complete search history.

(56) References Cited

U.S. PATENT DOCUMENTS

| | | | |
|---|---|---|---|
| 5,983,614 A | 11/1999 | Hancock et al. | |
| 6,240,713 B1 | 6/2001 | Thomas | |
| 8,282,112 B2 | 10/2012 | Rich | |
| 8,496,256 B2 | 7/2013 | Bebernes et al. | |
| 8,740,229 B2 * | 6/2014 | Ellsworth | B62D 6/04 280/86 |
| 8,925,672 B2 * | 1/2015 | Bebernes | B62D 5/093 180/403 |
| 9,421,999 B2 * | 8/2016 | Rotole | B62D 5/08 |
| 10,293,855 B2 | 5/2019 | Swecker | |
| 10,464,374 B1 | 11/2019 | Jolley | |
| 2006/0175098 A1 * | 8/2006 | Sutherland | B62D 1/02 180/6.24 |

(Continued)

*Primary Examiner* — Tony H Winner
*Assistant Examiner* — Marlon A Arce
(74) *Attorney, Agent, or Firm* — R. Keith Harrison

(57) ABSTRACT

Mower castor swivel and steering control systems may include a pair of castor wheel engaging assemblies carried by the lawnmower frame of the riding lawnmower. The pair of castor wheel engaging assemblies may be configured for selective actuation to prevent swiveling of the pair of front castor wheels, respectively, on the riding lawnmower. At least one actuating device may operably engage the pair of castor wheel engaging assemblies. The at least one actuating device may be configured to actuate the pair of castor wheel engaging assemblies responsive to selective actuation by a mower operator of the riding lawnmower. A castor wheel steering assembly may operably engage the pair of castor wheel engaging assemblies. The castor wheel steering assembly may be configured to steer the pair of front castor wheels responsive to selective actuation by the mower operator simultaneous with actuation of the at least one actuating device.

18 Claims, 12 Drawing Sheets

(56) References Cited

U.S. PATENT DOCUMENTS

| | | | |
|---|---|---|---|
| 2009/0000839 A1* | 1/2009 | Ishii | B60L 8/003 180/65.51 |
| 2009/0152828 A1* | 6/2009 | Bebernes | B62D 11/04 280/86 |
| 2012/0007325 A1 | 1/2012 | Rich | |

* cited by examiner

MOWER CASTOR SWIVEL AND STEERING CONTROL SYSTEMS

CROSS REFERENCE TO RELATED APPLICATIONS

This application claims the benefit of U.S. provisional application No. 63/060,429, filed Aug. 3, 2020 and entitled MOWER CASTOR SWIVEL AND STEERING CONTROL SYSTEMS, which provisional application is hereby incorporated by reference herein in its entirety.

FIELD

Illustrative embodiments of the disclosure generally relate to riding lawnmowers. More particularly, illustrative embodiments of the disclosure relate to systems which provide an operator of a riding lawnmower with selective control over the swiveling and steering actions of the front castor wheels on the mower to aid in directional control of the mower, particularly as the mower is operated across a sloped surface.

BACKGROUND

The background description provided herein is solely for the purpose of generally presenting the context of the illustrative embodiments of the disclosure. Aspects of the background description are neither expressly nor impliedly admitted as prior art against the claimed subject matter.

Riding lawnmowers typically include a mower frame fitted with a pair of fixed-direction rear mower wheels and a pair of swiveling front castor wheels. An operator seat is provided on the mower frame between the rear pair and the front pair of wheels. A pair of operator handles on opposite sides of the seat controls the direction of rotation of the rear mower wheels on the corresponding sides of the mower. Accordingly, as he or she sits on the operator seat, an operator of the mower both actuates the mower in the forward or rearward direction and steers the mower by selective manual forward or reverse manipulation of the operator handles.

As the mower is operated across a sloped surface, the front castor wheels typically track in a downward direction such that the mower has a tendency to travel toward the bottom of the surface. The mower operator typically must therefore continually readjust the steering direction of the rear mower wheels in order to maintain a level travel path across the surface.

Accordingly, systems which provide an operator of a riding lawnmower with selective control over the swiveling and steering actions of the front castor wheels on the mower to aid in directional control of the mower, particularly as the mower is operated across a sloped surface, are needed.

SUMMARY

Illustrative embodiments of the disclosure are generally directed to mower castor swivel and steering control systems for controlling swiveling and steering actions of a pair of front castor wheels on a riding lawnmower having a lawnmower frame. An illustrative embodiment of the mower castor swivel and steering control systems may include a pair of castor wheel engaging assemblies carried by the lawnmower frame of the riding lawnmower. The pair of castor wheel engaging assemblies may be configured for selective actuation to prevent swiveling of the pair of front castor wheels, respectively, on the riding lawnmower. At least one actuating device may operably engage the pair of castor wheel engaging assemblies. The at least one actuating device may be configured to actuate the pair of castor wheel engaging assemblies responsive to selective actuation by an operator of the riding lawnmower. A castor wheel steering assembly may operably engage the pair of castor wheel engaging assemblies. The castor wheel steering assembly may be configured to steer the pair of front castor wheels responsive to selective actuation by the mower operator simultaneous with actuation of the at least one actuating device.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear". "right", "front" "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
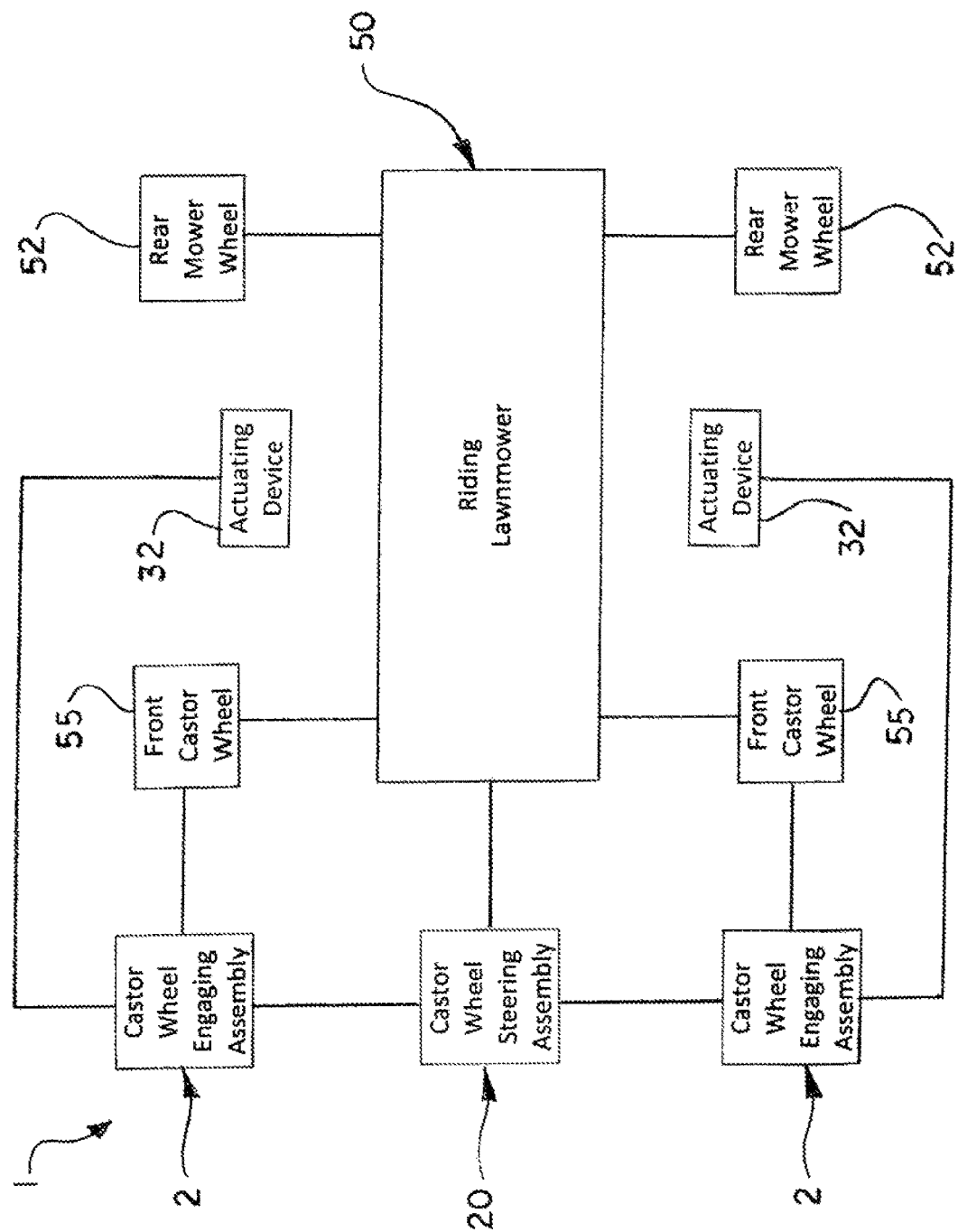
FIG. 1 is a block diagram of an illustrative embodiment of the mower castor swivel and steering control systems of the disclosure.
Figure 2:
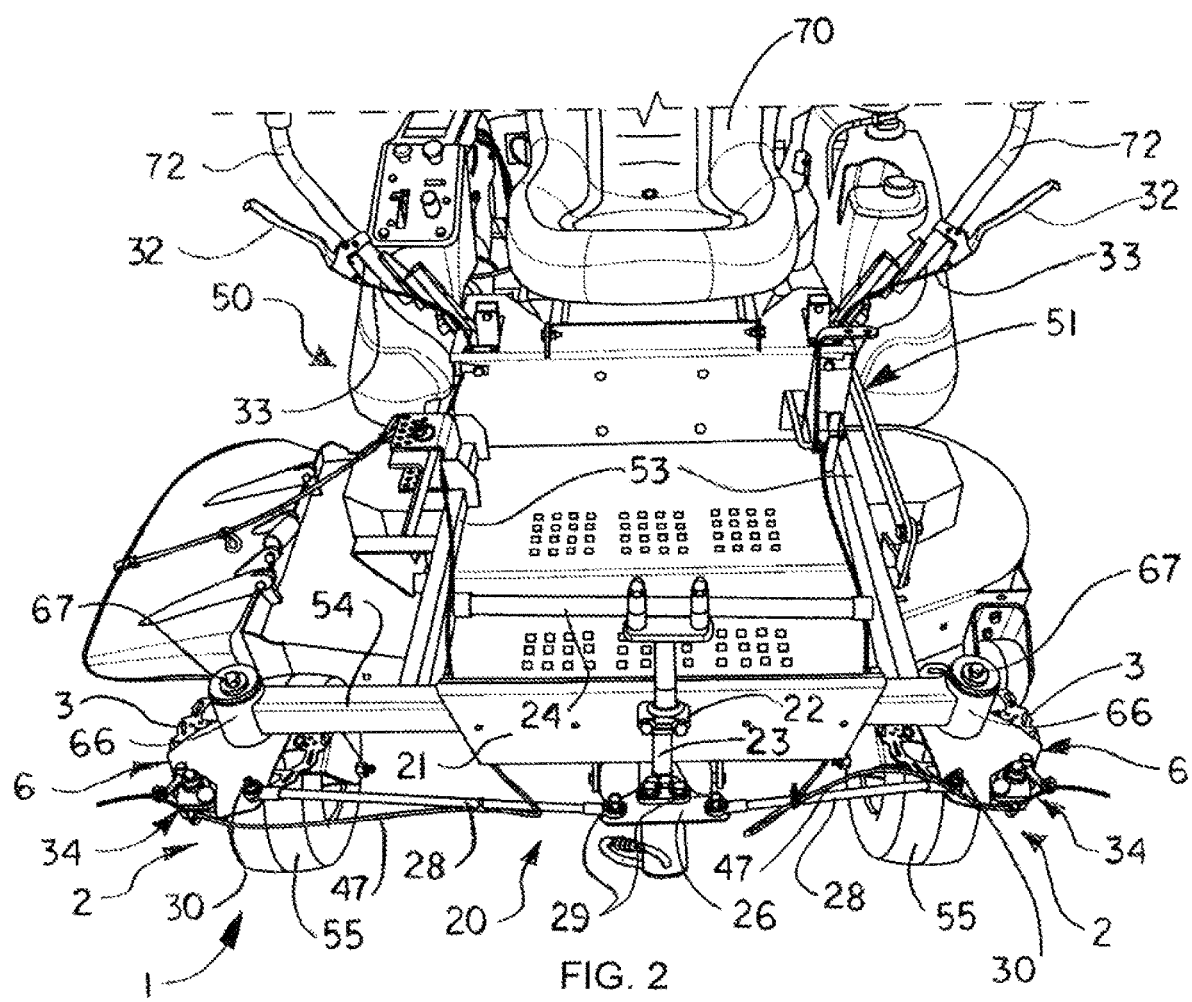
FIG. 2 is a front perspective view, partially in section, of a typical riding lawnmower, with an illustrative embodiment of the mower castor swivel and steering control systems installed on the mower.

Referring initially to FIGS. 1 and 2 of the drawings, an illustrative embodiment of the mower castor swivel and steering control systems, hereinafter system, is generally indicated by reference numeral 1. In typical application, which will be hereinafter described, the system 1 may be fitted on a riding lawnmower 50, which may have a standard or conventional riding lawnmower design. Accordingly, the riding lawnmower 50 may include a mower frame 51 (FIG. 2). An operator seat 70 may be provided on the mower frame 51. A pair of rear mower wheels 52 (FIG. 1) may be provided on the mower frame 51 behind the operator's seat 70. As illustrated in FIG. 2, a pair of side frame members 53 of the mower frame 51 may extend forwardly of the operator's seat 70. A front frame member 54 may extend between the side frame members 53. A pair of swiveling front castor wheels 55 may be mounted at the respective ends of the front frame member 54.

A pair of mower operator handles 72 (FIG. 2) may be provided on the riding lawnmower 50 on opposite sides of the operator seat 70. Forward movement of each mower operator handle 72 may facilitate forward rotation of the rear mower wheel 52 on the corresponding side of the mower frame 51. Conversely, rearward movement of each mower operator handle 72 may facilitate rearward rotation of the rear mower wheel 52 on the corresponding side of the mower frame 51. Accordingly, the mower operator handles 72 may enable an operator (not illustrated) seated on the operator's seat 70 to facilitate forward/reverse operation and steering of the riding lawnmower 50 by the respective forward and reverse manipulation of the mower operator handles 72.

The system 1 may include a pair of castor wheel engaging assemblies 2. Each castor wheel engaging assembly 2 may be selectively actuated to engage each corresponding front castor wheel 55 to prevent the front castor wheel 55 from swiveling on the mower frame 51. At least one, and typically, a pair of actuating devices 32 may each operably interface with each corresponding castor wheel engaging assembly 2. Each actuating device 32 may be provided in a location on the mower frame 51 which is suitable to render the actuating device 32 easily accessible to a mower operator as the mower operator sits on the operator seat 70. Each actuating device 32 may include at least one lever, handle, button, switch and/or other control element which is suitable for the purpose. Accordingly, the mower operator may selectively actuate each corresponding castor wheel engaging assembly 2 by manipulation of the corresponding actuating device 32.

The system 1 may include at least one castor wheel steering assembly 20 provided on the mower frame 51. The castor wheel steering assembly 20 may enable the mower operator to steer the front castor wheels 55 as the castor wheel engaging assemblies 2 engage and prevent swiveling of the respective front castor wheels 55 responsive to the mower operator's selective manipulation of the respective actuating devices 32. Accordingly, the system 1 may provide the mower operator with selective control over the swiveling action with or without simultaneous control of the steering action of the front castor wheels 55 on the riding lawnmower 50. Control over the swiveling and steering actions of the front castor wheels 55 may aid in the ability of the mower operator to control steering of the riding lawnmower 50, particularly as the riding lawnmower 50 is operated across a sloped surface, typically as will be hereinafter further described.

Figure 6:
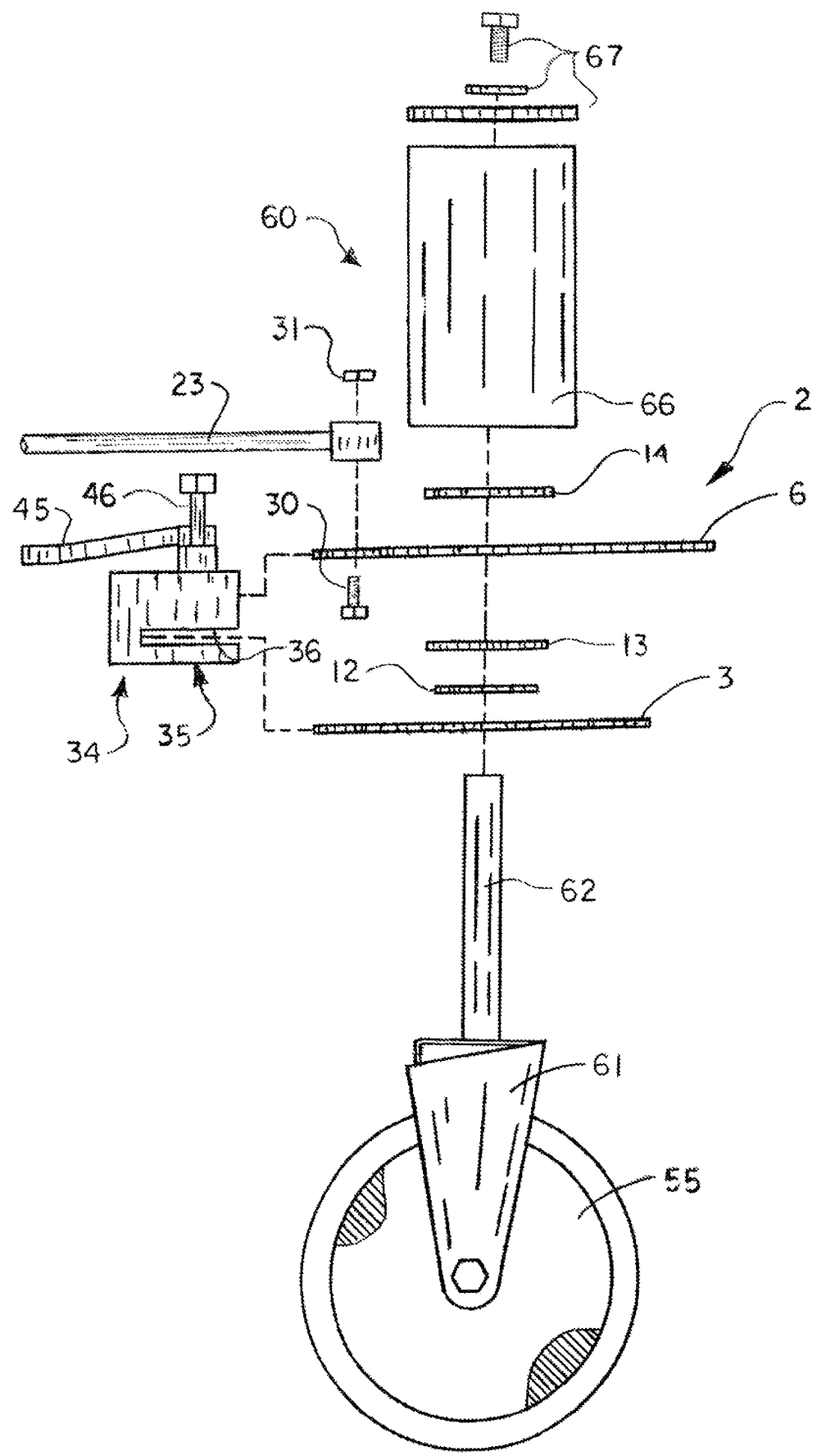
FIG. 6 is an exploded side view of one of the castor wheel engaging assemblies.
Figure 7:
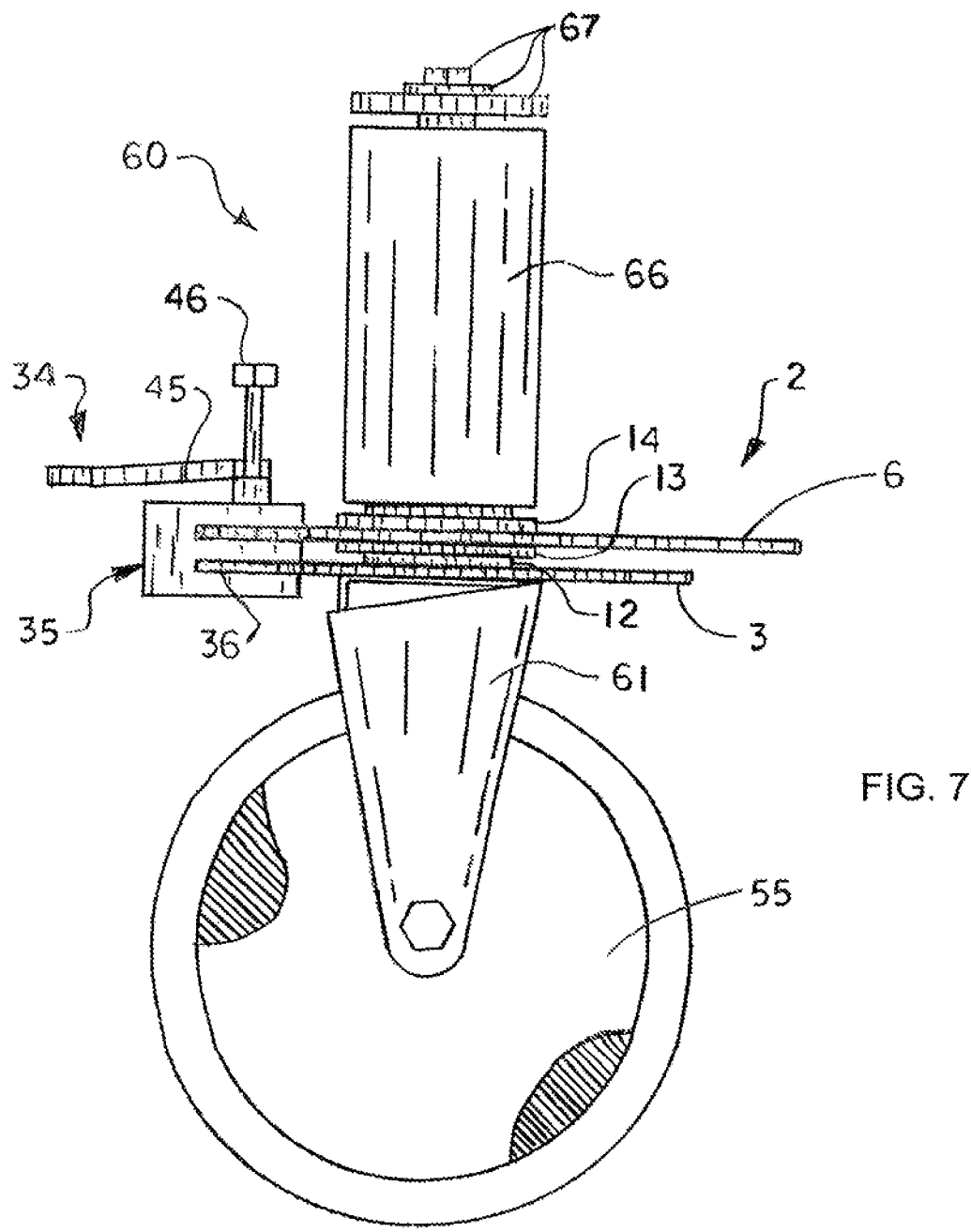
FIG. 7 is a side view of the assembled castor wheel engaging assembly.

Referring next to FIGS. 2-9 of the drawings, each castor wheel engaging assembly 2 of the system 1 may include any type of device or mechanism or have any design which is configured to engage each front castor wheel 55 and prevent swiveling of the front castor wheel 55 on the mower frame 51. As illustrated in FIGS. 6 and 7, each front castor wheel 55 of the riding lawnmower 50 may be part of a front castor wheel assembly 60. Each front castor wheel assembly 60 may include a front wheel frame 61. The front castor wheel 55 may be rotatably mounted in the front wheel frame 61. A front wheel post 62 may extend from the front wheel frame 61. As illustrated in FIG. 2, a wheel post housing 66 of each front castor wheel assembly 60 may terminate each corresponding end of the front frame member 54 of the mower frame 51. The front wheel post 62 may be rotatably mounted in the wheel post housing 66 to swivelly mount the front castor wheel 55 relative to the mower frame 51. At least one wheel fastener 67 may secure the front wheel post 62 in the wheel post housing 66 according to the knowledge of those skilled in the art.

Figure 4:
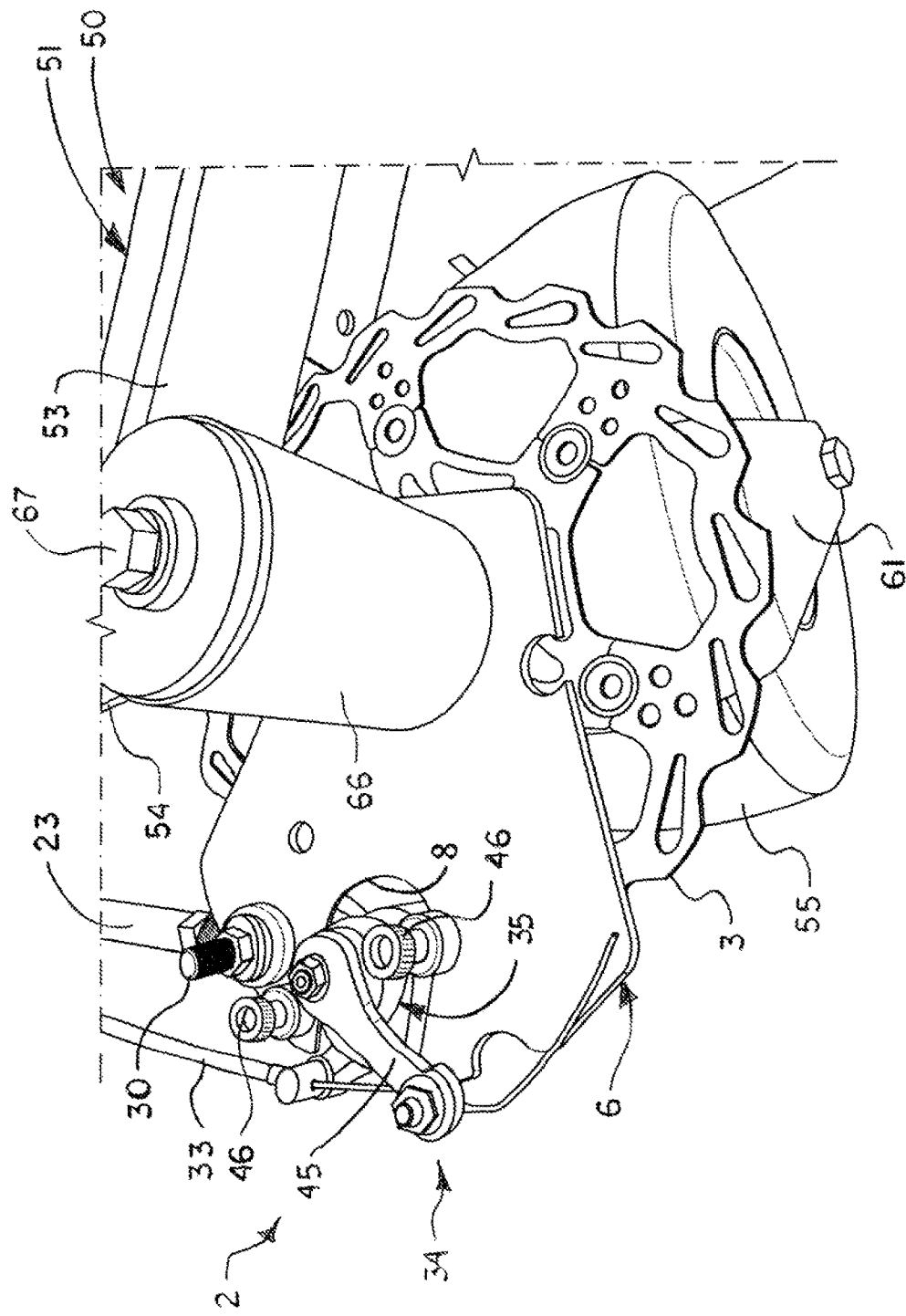
FIG. 4 is a top side perspective view of a typical castor wheel engaging assembly illustrated in FIG. 3.
Figure 5:
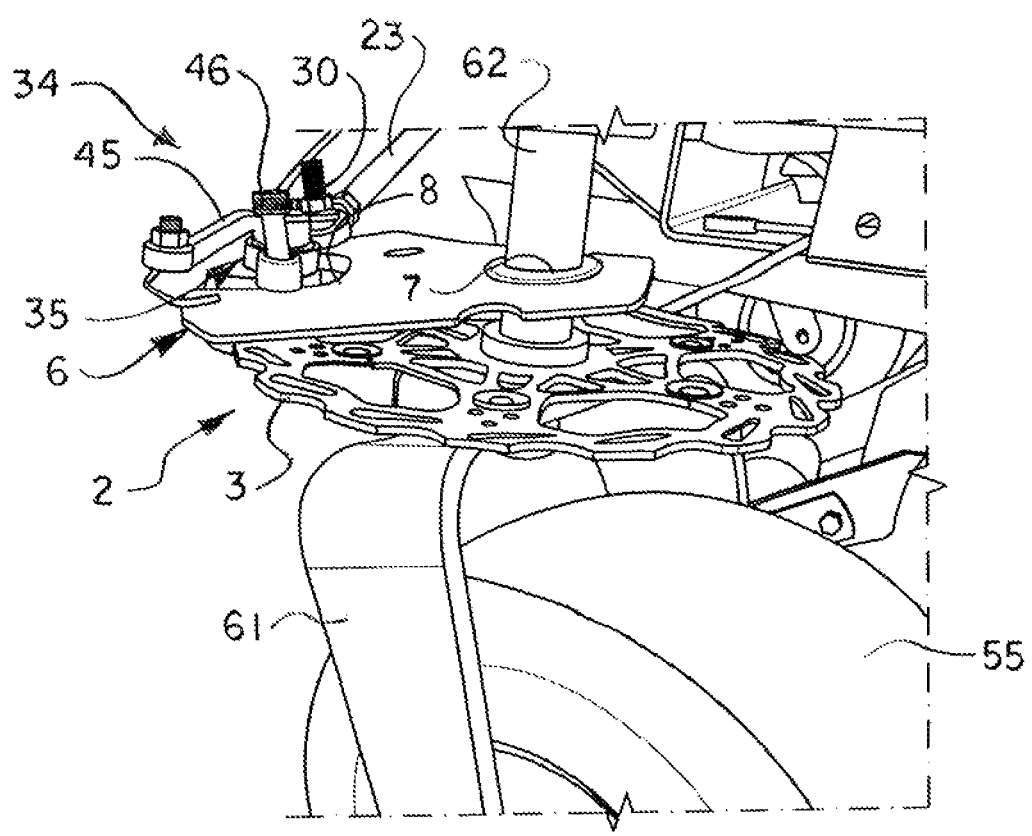
FIG. 5 is a rear perspective view of the castor wheel engaging assembly in a partially disassembled state.

In some embodiments, each castor wheel engaging assembly 2 may include a wheel disk 3. The wheel disk 3 may be welded, fastened and/or otherwise fixedly attached to the front wheel post 62 of the front castor wheel assembly 60 typically in concentric relationship to the front wheel post 62. Accordingly, the wheel disk 3 may rotate with the front wheel post 62 and front wheel frame 61 as the front castor wheel 55 swivels. A wheel lock plate 6 may be disposed adjacent to and stationary with respect to the wheel disk 3. The wheel disk 3 may be configured to normally rotate relative to the wheel lock plate 6 as the front wheel post 62 rotates in the wheel post housing 66 of the front castor wheel assembly 60. Upon selective actuation by the mower operator, the actuating device 32 (FIGS. 1 and 2) may be configured to selectively lock the wheel disk 3 relative to the wheel lock plate 6, typically as will be hereinafter described, such that the wheel disk 3 is prevented from rotating relative to the wheel lock plate 6 and the front castor wheel 55 cannot swivel. As illustrated in FIG. 4, in some embodiments, a caliper notch 8 may extend into the wheel lock plate 6 for purposes which will be hereinafter described.

As further illustrated in FIGS. 6 and 7, in typical assembly of the castor wheel engaging assembly 2, the front wheel post 62 may be extended through a wheel post opening (not illustrated) in the wheel lock plate 6. The wheel lock plate 6 may be fixedly mounted relative to the front wheel post 62 and/or the wheel post housing 66 via fastening, welding and/or other suitable technique. A spacer 12 and a lower shim 13 may be disposed on the front wheel post 62 between the wheel disk 3 and the wheel lock plate 6. An upper shim 14 may be disposed on the front wheel post 62 between the wheel lock plate 6 and the wheel post housing 66 of the front castor wheel assembly 60 for spacing purposes.

Figure 8:
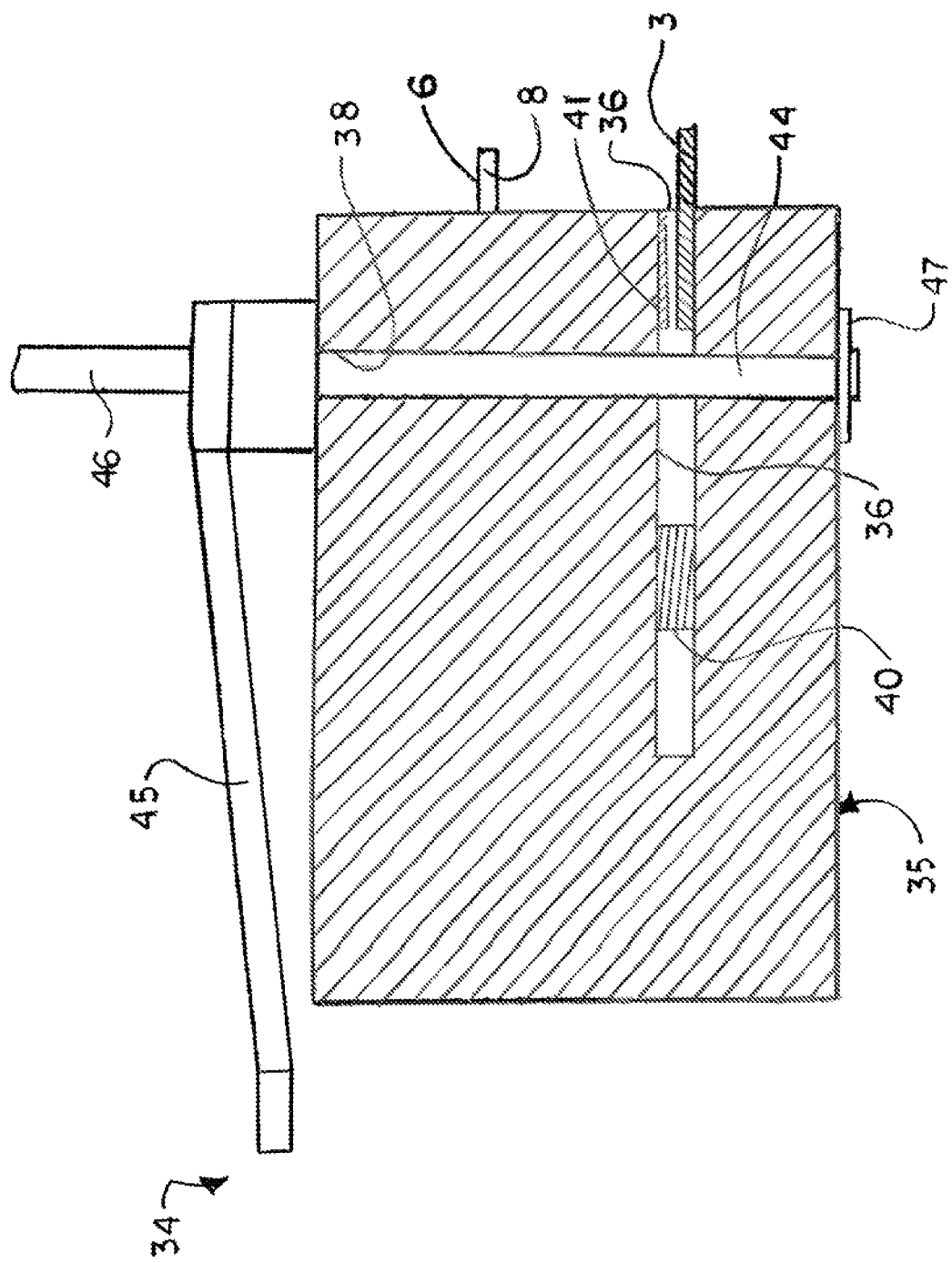
FIG. 8 is a sectional view of a typical caliper body of a caliper of a typical castor wheel engaging assembly according to some embodiments of the mower castor swivel and steering control systems, with the caliper in a disk-disengaging configuration to selectively permit swiveling of the corresponding front castor wheel on the mower.
Figure 9:
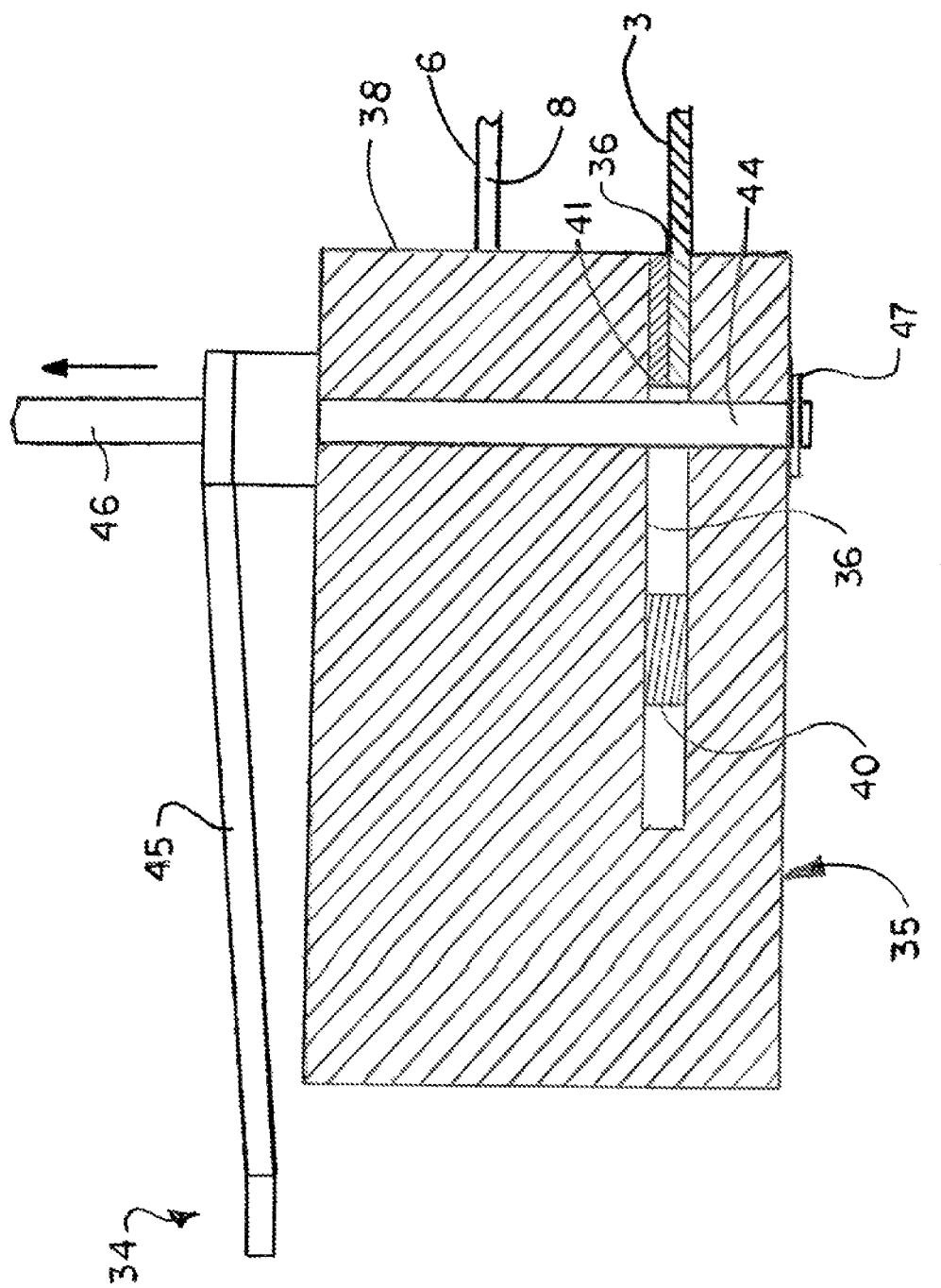
FIG. 9 is a sectional view of the typical caliper body of the caliper, with the caliper in a disk-engaging configuration to selectively prevent swiveling of the corresponding front castor wheel on the mower.

As further illustrated in FIGS. 6-9, in some embodiments, each castor wheel engaging assembly 2 may include at least one caliper 34. The caliper 34 may be selectively operable between a wheel release position (FIG. 8) and a wheel lock position (FIG. 9), typically responsive to mechanical actuation by each corresponding actuating device 32 (FIGS. 1 and 2). Accordingly, a control cable 33 (FIGS. 2-4) may operably connect each caliper 34 to its corresponding actuating device 32. In the wheel release position, the caliper 34 may be configured to disengage the wheel disk 3, as illustrated in FIG. 8. In the wheel lock position, the caliper 34 may be configured to engage and prevent rotation of the wheel disk 3, as illustrated in FIG. 9.

Each caliper 34 may have any design which is suitable for the purpose of selective engagement and locking of the wheel disk 3 relative to the wheel lock plate 6 to prevent rotation of the wheel disk 3 according to the knowledge of those skilled in the art. Accordingly, as illustrated in FIGS. 8 and 9, in some embodiments, each caliper 34 may include a caliper body 35. The caliper body 35 of the caliper 34 may be fixedly attached to the wheel lock plate 6 according to the knowledge of those skilled in the art. Accordingly, the caliper notch 8 (FIG. 4) in the wheel lock plate 6 may receive and accommodate the caliper body 35. As particularly illustrated in FIGS. 4-9, in some embodiments, at least one caliper fastener 46 may attach the caliper body 35 to the wheel lock plate 6.

As illustrated in FIGS. 6-9, a wheel disk slot 36 may extend into the caliper body 35. The wheel disk 3 may extend into the wheel disk slot 36. The wheel disk 3 may be rotatable in the wheel disk slot 36. As illustrated in FIGS. 8 and 9, at least one slot return spring 40 may be disposed within the wheel disk slot 36 to normally maintain the wheel disk slot 36 in an open, disk-disengaging configuration. In some embodiments, at least one slot plate 41 may be provided in the wheel disk slot 36. In the open, disk-disengaging configuration of the wheel disk slot 36, the slot plate 41 may be disposed in spaced-apart relationship to the wheel disk 3, as illustrated in FIG. 8, for purposes which will be hereinafter described.

As further illustrated in FIGS. 8 and 9, a caliper rod 44 may extend through a caliper rod opening 38 in the caliper body 35. A rod head 47 may terminate the caliper rod 44 exterior to the caliper body 35. The rod head 47 may engage the exterior surface of the caliper body 35. A caliper lever 45 may operably engage the caliper rod 44. The control cable 33 (FIGS. 2-5) which extends from the actuating device 32 may operably engage the caliper lever 45. Accordingly, responsive to manipulation of the actuating device 32, the control cable 33 may pivot the caliper lever 45 from the wheel release position to the wheel lock position. As it pivots, the caliper lever 45 may axially displace the caliper rod 44 in the caliper rod opening 38 such that the rod head 47 on the caliper rod 44 deforms or displaces the caliper body 35, typically against the bias imparted by the slot return spring 40, and reduces the width of the wheel disk slot 36 from the expanded, disk-disengaging, wheel release position illustrated in FIG. 8 to the reduced width, disk-engaging, wheel lock position in FIG. 9. Consequently, the slot plate 41 in the wheel disk slot 36 may engage the wheel disk 3 to prevent the wheel disk 3 from rotating in the wheel disk slot 36, and thus, lock or prevent the swiveling action of the corresponding front castor wheel 55.

Responsive to subsequent release of the actuating device 32, the control cable 33 may pivot the caliper lever 45 from the wheel lock position to the wheel release position. Accordingly, the caliper lever 45 may release the caliper rod 44 such that the rod head 47 releases the caliper body 35. Consequently, the wheel disk slot 36 may return to the expanded width, disk-disengaging position illustrated in FIG. 8, typically via actuation of the slot return spring 40. The wheel disk 3 is therefore free to rotate within the wheel disk slot 36, enabling free swiveling of the front castor wheel 55.

Each castor wheel engaging assembly 2 may include alternative devices, mechanisms or assemblies known by those skilled in the art and suitable for the purpose of selectively locking rotation of each front castor wheel 55 with respect to the wheel post housing 66 or mower frame 51 of the riding lawnmower 50. Each actuating device 32 and castor wheel engaging assembly 2 may be mechanical, hydraulic, pneumatic, electric, electromechanical, magnetic or any combination thereof.

Figure 3:
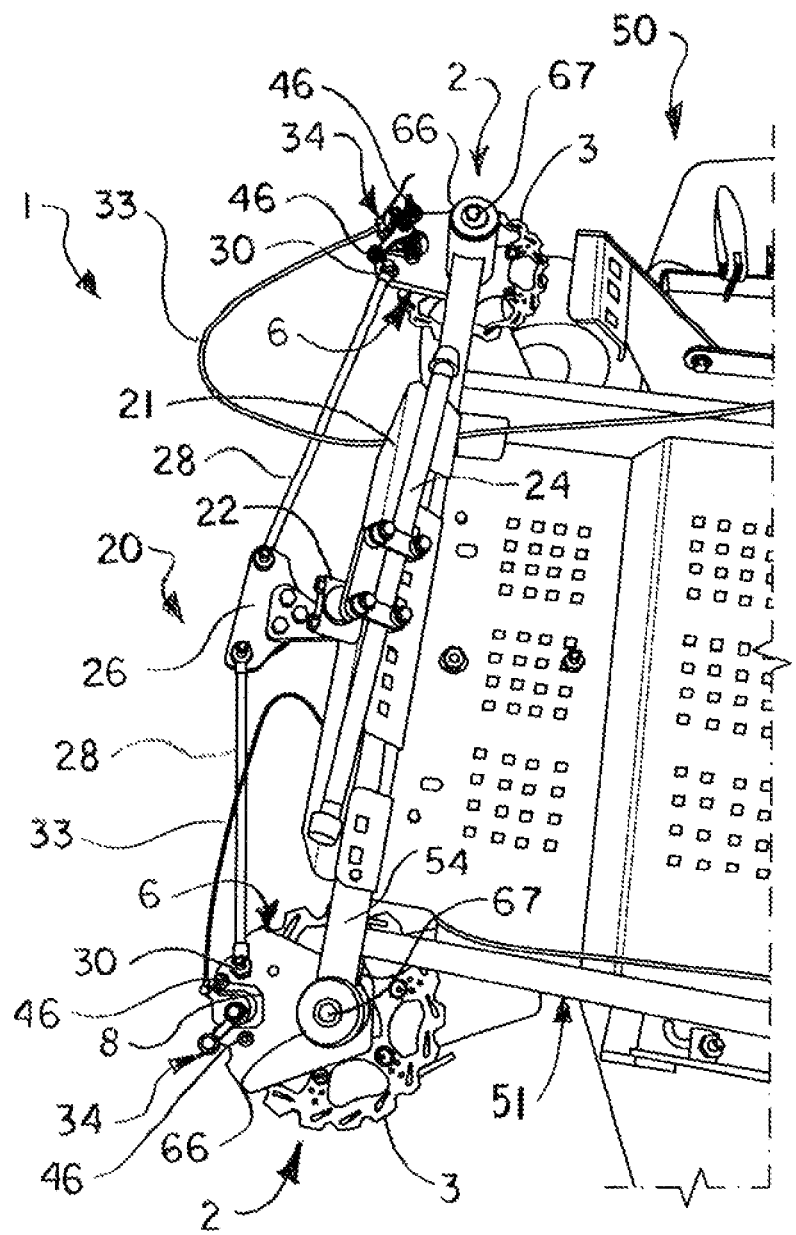
FIG. 3 is a side perspective view, partially in section, of the mower, with a typical pair of castor wheel engaging assemblies and a typical castor wheel steering assembly interfacing with the castor wheel engaging assemblies according to an illustrative embodiment of the mower castor swivel and steering control systems.

The castor wheel steering assembly 20 of the system 1 may have any design which is suitable for the purpose of enabling the mower operator to steer the front castor wheels 55 as he or she actuates the castor wheel engaging assemblies 2 typically by manipulation of the respective actuating devices 32. Accordingly, as illustrated in FIGS. 2 and 3, in some embodiments, the castor wheel steering assembly 20 may include at least one shaft mount plate 21. The shaft mount plate 21 may be attached to the front frame member 54 of the mower frame 51 using fasteners, welding and/or other suitable attachment technique known by those skilled in the art. At least one shaft mount collar 22 may be provided on the shaft mount plate 21. A steering shaft 23 (FIG. 2) may extend through the shaft mount collar 22 such that the steering shaft 23 is rotatable with respect to the shaft mount collar 22. An elongated foot bar 24 may engage the steering shaft 23.

A steering flange 26 may be provided on the steering shaft 23. The steering flange 26 may be welded, fastened and/or otherwise fixedly mounted with respect to the steering shaft 23 such that the steering flange 26 rotates with the steering shaft 23. The proximal ends of a respective pair of steering rods 28 may be pivotally attached to the steering flange 26, typically via a respective pair of proximal rod fasteners 29. The distal ends of the respective steering rods 28 may be pivotally attached to the wheel lock plates 6 typically via a respective pair of distal rod fasteners 30. Accordingly, responsive to rotation of the foot bar 24, rotation may be transmitted to the steering shaft 23 and the steering flange 26, respectively. The steering flange 26 may rotate or pivot the wheel lock plates 6 via the respective steering rods 28. When the calipers 34 engage the respective wheel disks 3 of the respective castor wheel engaging assemblies 2 in the wheel lock position, typically as was heretofore described with respect to FIG. 9, each wheel disk 3 and corresponding front castor wheel 55 may in like manner rotate or pivot with each corresponding wheel lock plate 6 to enable the mower operator to steer the front castor wheels 55 typically by pivoting the foot bar 24 using his or her feet. When the calipers 34 disengage the respective wheel disks 3 in the wheel release position, the wheel lock plates 6 may rotate or pivot with respect to the stationary wheel disks 3 to permit free swiveling action of the front castor wheels 55.

Figure 10:
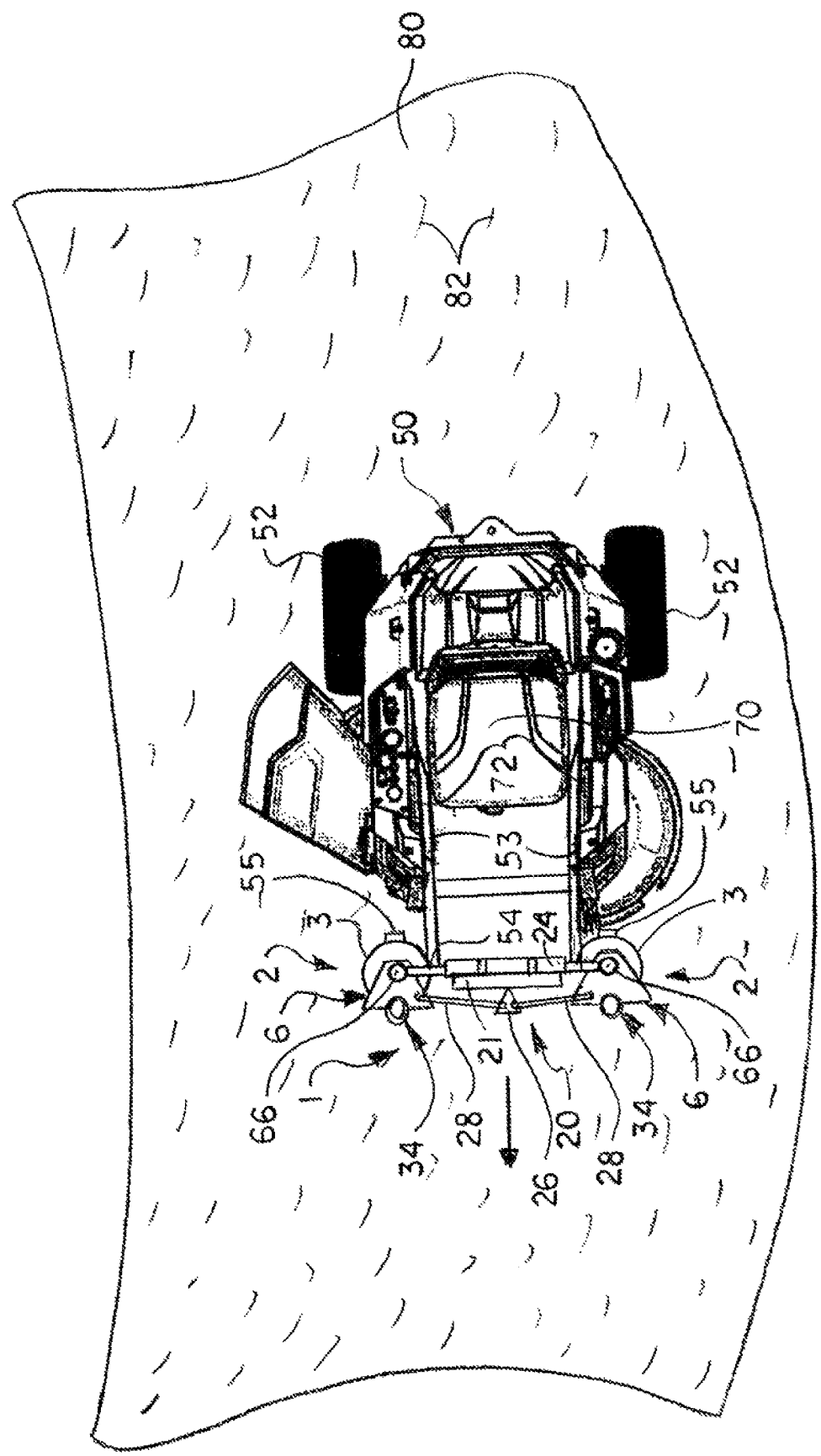
FIG. 10 is a top view of the riding lawnmower, fitted with an illustrative embodiment of the mower castor swivel and steering control systems, with the front castor wheels of the mower selectively engaged to prevent swiveling of the wheels and facilitate travel of the mower in a straight travel path across a slope in typical application of the systems.
Figure 11:
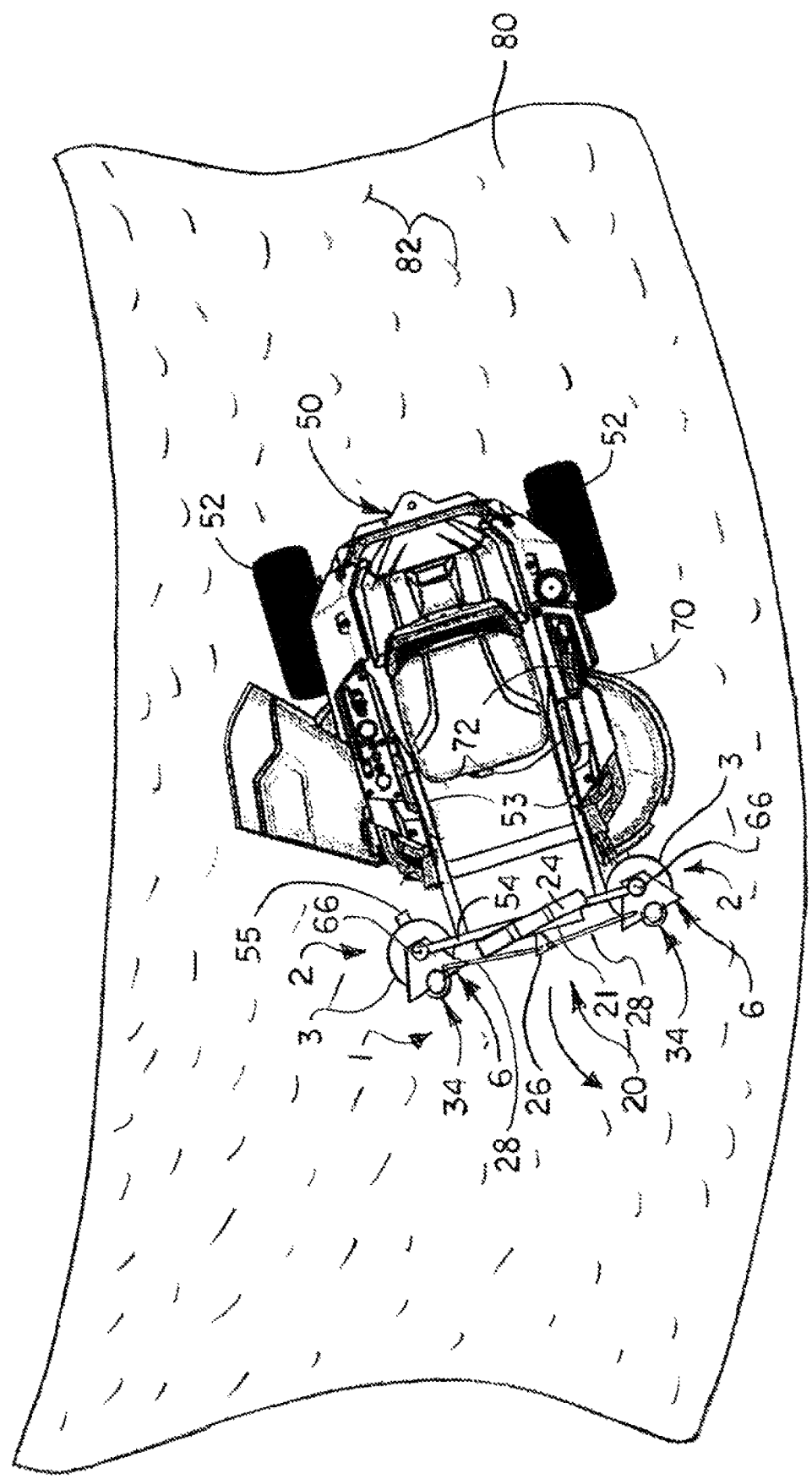
FIG. 11 is a top view of the riding lawnmower, with the front castor wheels of the mower selectively disengaged such that the front castor wheels swivel downwardly and the mower travels in a downward travel path on the slope.
Figure 12:
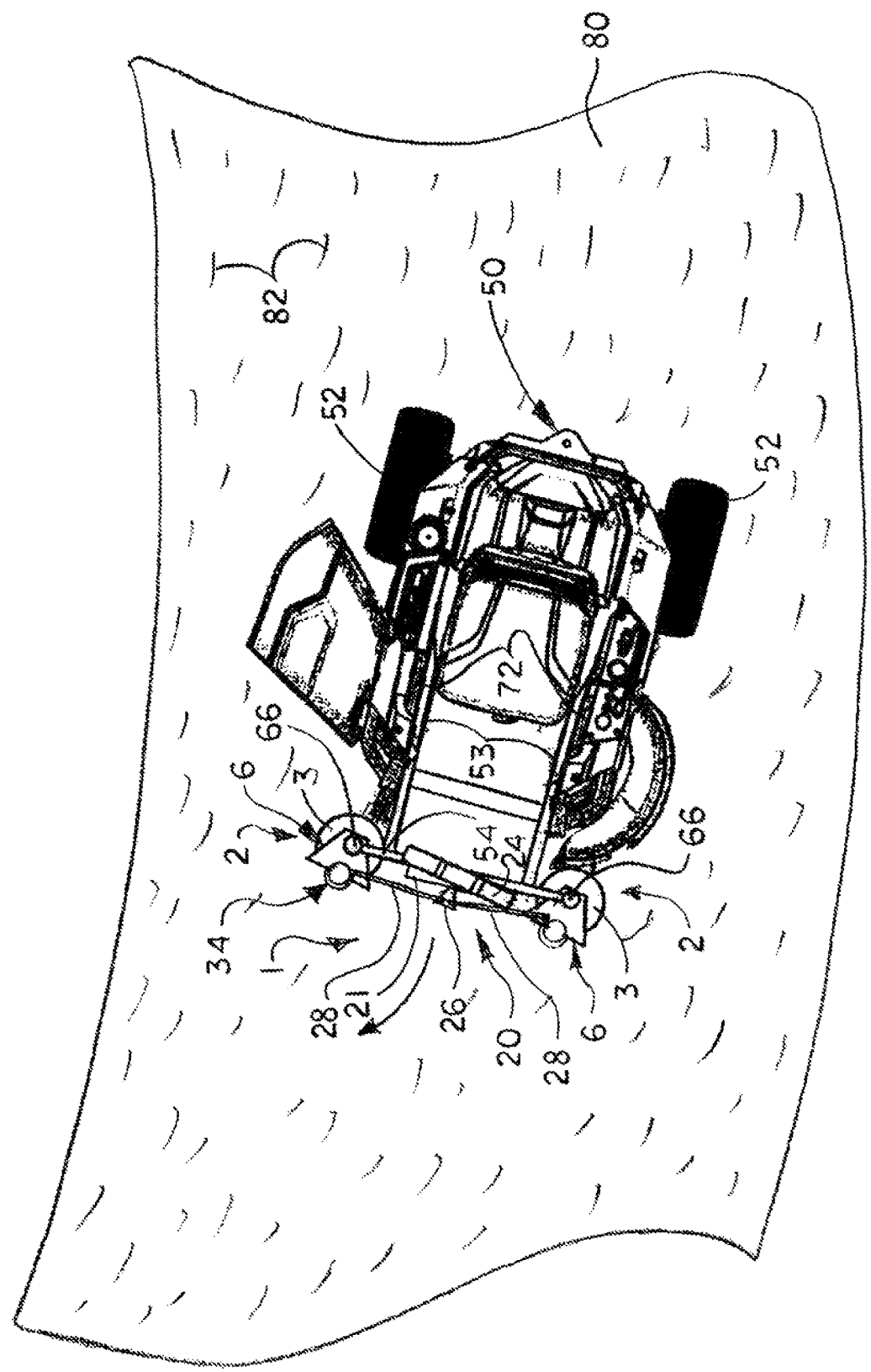
FIG. 12 is a top view of the riding lawnmower, with the front castor wheels of the mower selectively engaged and steered in an upward direction such that the mower travels in an upward travel path on the slope.

Referring next to FIGS. 10-12 of the drawings, in typical application of the system 1, the riding lawnmower 50 may be operated to cut grass 82 on flat, level surfaces as well as on a slope 80. On a flat surface, the riding lawnmower 50 may be operated in the usual manner as the mower operator (not illustrated) typically sits on the operator seat 70. Accordingly, the mower operator may use the mower operator handles 72 to traverse the surface in the forward and rearward directions as well as steer the riding lawnmower 50, typically as was heretofore described. The castor wheel engaging assemblies 2 of the system 1 typically remain disengaged to enable the front castor wheels 55 to freely swivel on the mower frame 51.

Under circumstances in which the riding lawnmower 50 is operated across a slope 80, as illustrated in FIGS. 10-12, the riding lawnmower 50 may have a natural tendency to follow the downhill trajectory or contour of the slope 80. Accordingly, as illustrated in FIG. 11, the front castor wheels 55 may swivel downwardly and cause the riding lawnmower 50 to travel in a downward travel path on the slope 80. The mower operator may then facilitate engagement of the castor wheel engaging assemblies 2 with the respective front castor wheels 55 typically by manipulating the respective actuating devices 32 (FIG. 2). This action may cause the calipers 34 to engage and lock the wheel disks 3 with the respective wheel lock plates 6 and prevent further swiveling of the front castor wheels 55. Simultaneously, the mower operator may use the foot bar 24 of the castor wheel steering assembly 20 to steer the front castor wheels 55 in an uphill travel path on the slope 80 typically via the steering shaft 23, steering flange 26, steering rods 28 and wheel lock plates 6, respectively, as was heretofore described with respect to FIG. 2. Accordingly, as illustrated in FIG. 12, the riding lawnmower 50 may follow an upward travel path on the slope 80. By continuing to engage the castor wheel engaging assemblies 2 while steering the front castor wheels 55 typically using the foot bar 24, the mower operator can maintain a level travel path across the slope 80, as illustrated in FIG. 10.

In some embodiments, the castor wheel steering assembly 20 may include at least one steering return spring (not illustrated) which returns the steering direction of the front castor wheels 55 to the straight travel position illustrated in FIG. 10. The steering return spring or springs may be deployed between the components of the castor wheel steering assembly 20 or between the castor wheel steering assembly 20 and the mower frame 51, as necessary to accomplish the function. For example and without limitation, in some embodiments, at least one steering return spring may be deployed between the steering flange 26 and the shaft mount plate 21. Accordingly, the steering return spring or springs may bias the steering flange 26 back to the center position such that the front castor wheels 56 are oriented in the straight trajectory in the event that the mower operator releases the foot bar 24.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A mower caster swivel and steering control system for controlling swiveling and steering actions of a pair of front caster wheels on a riding lawnmower having a lawnmower frame, comprising:
    a pair of caster wheel engaging assemblies configured for attachment to the lawnmower frame of the riding lawnmower, the pair of caster wheel engaging assemblies configured for selective actuation to engage and prevent swiveling of the pair of front caster wheels, respectively, on the riding lawnmower;
    at least one actuating device operably engaging the pair of caster wheel engaging assemblies, the at least one actuating device configured to actuate the pair of caster wheel engaging assemblies responsive to selective actuation by a mower operator of the riding lawnmower;
    a caster wheel steering assembly operably engaging the pair of caster wheel engaging assemblies, the caster wheel steering assembly configured to steer the pair of front caster wheels responsive to selective actuation by the mower operator simultaneous with actuation of the at least one actuating device; and
    wherein each of the pair of caster wheel engaging assemblies comprises:
        a wheel disk configured to rotate as each corresponding one of the pair of front caster wheels swivels on the lawnmower frame;
        a wheel lock plate pivotally carried by the lawnmower frame and disposed adjacent to and stationary with respect to the wheel disk, the at least one actuating device configured to selectively lock the wheel disk relative to the wheel lock plate and prevent the wheel disk from rotating relative to the wheel lock plate and the corresponding one of the front caster wheels from swiveling, and the caster wheel steering assembly engages the wheel lock plate; and
        at least one caliper carried by the wheel lock plate and operably engaged by the at least one actuating device, the caliper selectively operable between a wheel release position disengaging the wheel disk to permit rotation of the wheel disk relative to the wheel lock plate and a wheel lock position engaging the wheel disk to prevent rotation of the wheel disk relative to the wheel lock plate responsive to mechanical actuation by the at least one actuating device.

2. The mower caster swivel and steering control system of claim 1 further comprising a control cable extending from the at least one actuating device to the caliper.

3. The mower caster swivel and steering control system of claim 2 wherein the at least one actuating device is a lever, handle, button or switch.

4. A mower caster swivel and steering control system for controlling swiveling and steering actions of a pair of front caster wheels on a riding lawnmower having a lawnmower frame, comprising:
    a pair of caster wheel engaging assemblies configured for attachment to the lawnmower frame of the riding lawnmower, the pair of caster wheel engaging assemblies configured for selective actuation to engage and prevent swiveling of the pair of front caster wheels, respectively, on the riding lawnmower;
    at least one actuating device operably engaging the pair of caster wheel engaging assemblies, the at least one actuating device configured to actuate the pair of caster wheel engaging assemblies responsive to selective actuation by a mower operator of the riding lawnmower;
    a caster wheel steering assembly operably engaging the pair of caster wheel engaging assemblies, the caster wheel steering assembly configured to steer the pair of front caster wheels responsive to selective actuation by the mower operator simultaneous with actuation of the at least one actuating device;

wherein each of the pair of caster wheel engaging assemblies comprises a wheel disk configured to rotate as each corresponding one of the pair of front caster wheels swivels on the lawnmower frame and a wheel lock plate pivotally carried by the lawnmower frame and disposed adjacent to and stationary with respect to the wheel disk, the at least one actuating device configured to selectively lock the wheel disk relative to the wheel lock plate and prevent the wheel disk from rotating relative to the wheel lock plate and the corresponding one of the front caster wheels from swiveling, and the caster wheel steering assembly engages the wheel lock plate; and wherein the caster wheel steering assembly comprises a steering shaft configured to be rotatably carried by the lawnmower frame, a foot bar engaging the steering shaft for rotation and a pair of steering rods engaged by the steering shaft, each of the pair of steering rods engaging the wheel lock plate of each corresponding one of the pair of caster wheel engaging assemblies.

5. The mower caster swivel and steering control system of claim 4 further comprising a shaft mount collar configured to be mounted on the lawnmower frame, and wherein the steering shaft is rotatably carried by the shaft mount collar.

6. The mower caster swivel and steering control system of claim 4 further comprising a steering flange carried by the steering shaft, and wherein the pair of steering rods is engaged by the steering flange.

7. A mower caster swivel and steering control system for controlling swiveling and steering actions of a pair of front caster wheels on a riding lawnmower having a lawnmower frame, a pair of rear mower wheels on the mower frame and a pair of mower operator handles on the mower frame to actuate forward and rearward rotation of the pair of rear mower wheels, respectively, the mower caster swivel and steering control system comprising:

a pair of caster wheel engaging assemblies configured for attachment to the lawnmower frame of the riding lawnmower, the pair of caster wheel engaging assemblies configured for selective actuation to engage and prevent swiveling of the pair of front caster wheels, respectively, on the riding lawnmower, each of the pair of caster wheel engaging assemblies including:
  a wheel disk configured to rotate as each corresponding one of the pair of front caster wheels swivels on the lawnmower frame; and
  a wheel lock plate pivotally carried by the lawnmower frame and disposed adjacent to and stationary with respect to the wheel disk; and
  at least one caliper carried by the wheel lock plate and selectively operable between a wheel release position disengaging the wheel disk to permit rotation of the wheel disk relative to the wheel lock plate and a wheel lock position engaging the wheel disk to prevent rotation of the wheel disk relative to the wheel lock plate:

a pair of actuating devices configured for mounting on the pair of mower operator handles, respectively, of the riding lawnmower, the pair of actuating devices operably engaging the at least one caliper of each corresponding one of the pair of caster wheel engaging assemblies, the pair of actuating devices configured to actuate the at least one caliper between the wheel release position and the wheel lock position responsive to selective actuation by a mower operator of the riding lawnmower; and a caster wheel steering assembly operably engaging the pair of caster wheel engaging assemblies, the caster wheel steering assembly configured to steer the pair of front caster wheels responsive to selective actuation by the mower operator simultaneous with actuation of the pair of actuating devices, respectively.

8. The mower caster swivel and steering control system of claim 7 further comprising a pair of control cables extending from the pair of actuating devices, respectively, to each corresponding one of the at least one caliper.

9. The mower caster swivel and steering control system of claim 8 wherein each of the pair of actuating devices is a lever, handle, button or switch.

10. The mower caster swivel and steering control system of claim 7 wherein the caster wheel steering assembly comprises a steering shaft configured to be rotatably carried by the lawnmower frame, a foot bar engaging the steering shaft for rotation and a pair of steering rods engaged by the steering shaft, each of the pair of steering rods engaging the wheel lock plate of each corresponding one of the pair of caster wheel engaging assemblies.

11. The mower caster swivel and steering control system of claim 10 further comprising a shaft mount collar configured to be mounted on the lawnmower frame, and wherein the steering shaft is rotatably carried by the shaft mount collar.

12. The mower caster swivel and steering control system of claim 10 further comprising a steering flange carried by the steering shaft, and wherein the pair of steering rods is engaged by the steering flange.

13. A mower caster swivel and steering control system for controlling swiveling and steering actions of a pair of front caster wheels on a riding lawnmower having a lawnmower frame, a pair of rear mower wheels on the mower frame and a pair of mower operator handles on the mower frame to actuate forward and rearward rotation of the pair of rear mower wheels, respectively, the mower caster swivel and steering control system comprising:

a pair of caster wheel engaging assemblies configured for attachment to the lawnmower frame of the riding lawnmower, the pair of caster wheel engaging assemblies configured for selective actuation to engage and prevent swiveling of the pair of front caster wheels, respectively, on the riding lawnmower, each of the pair of caster wheel engaging assemblies including:
  a wheel disk configured to rotate as each corresponding one of the pair of front caster wheels swivels on the lawnmower frame;
  a wheel lock plate pivotally carried by the lawnmower frame and disposed adjacent to and stationary with respect to the wheel disk; and
  a caliper carried by the wheel lock plate and selectively operable between a wheel release position disengaging the wheel disk to permit rotation of the wheel disk relative to the wheel lock plate and a wheel lock position engaging the wheel disk to prevent rotation of the wheel disk relative to the wheel lock plate, the caliper having:
    a caliper body;
    a wheel disk slot extending into the caliper body;
    at least one slot return spring disposed in the wheel disk slot, the at least one slot return spring normally maintaining the wheel disk slot in an open, disk-disengaging configuration;

at least one slot plate in the wheel disk slot, the at least one slot plate disposed in spaced-apart relationship to the wheel disk in the open, disk-disengaging configuration of the wheel disk slot;
a caliper rod engaging the caliper body; and
a caliper lever engaging the caliper rod;
a pair of actuating devices configured for mounting on the pair of mower operator handles, respectively, of the riding lawnmower, the pair of actuating devices operably engaging the caliper lever of the caliper of each corresponding one of the pair of caster wheel engaging assemblies, the pair of actuating devices configured to actuate the caliper rod and the wheel disk slot of the caliper between the wheel release position and the wheel lock position responsive to selective actuation by a mower operator of the riding lawnmower; and
a caster wheel steering assembly operably engaging the pair of caster wheel engaging assemblies, the caster wheel steering assembly configured to steer the pair of front caster wheels responsive to selective actuation by the mower operator simultaneous with actuation of the pair of actuating devices, respectively.

14. The mower caster swivel and steering control system of claim 13 further comprising a pair of control cables extending from the pair of actuating devices, respectively, to the caliper of each corresponding one of the pair of caster wheel engaging assemblies.

15. The mower caster swivel and steering control system of claim 8 wherein each of the pair of actuating devices is a lever, handle, button or switch.

16. The mower caster swivel and steering control system of claim 13 wherein the caster wheel steering assembly comprises a steering shaft configured to be rotatably carried by the lawnmower frame, a foot bar engaging the steering shaft for rotation and a pair of steering rods engaged by the steering shaft, each of the pair of steering rods engaging the wheel lock plate of each corresponding one of the pair of caster wheel engaging assemblies.

17. The mower caster swivel and steering control system of claim 16 further comprising a shaft mount collar configured to be mounted on the lawnmower frame, and wherein the steering shaft is rotatably carried by the shaft mount collar.

18. The mower caster swivel and steering control system of claim 16 further comprising a steering flange carried by the steering shaft, and wherein the pair of steering rods is engaged by the steering flange.

* * * * *